United States Patent [19]

Solodar et al.

[11] Patent Number: 4,789,400

[45] Date of Patent: Dec. 6, 1988

[54] WATERFAST INK JET COMPOSITIONS AND PROCESS

[75] Inventors: Warren E. Solodar, Rochester; Henry R. Kang, Fairport; Joseph R. Weber, Rochester, all of N.Y.

[73] Assignee: Xerox Corporation, Stamford, Conn.

[21] Appl. No.: 71,827

[22] Filed: Jul. 10, 1987

[51] Int. Cl.⁴ ............................................. C09D 11/02
[52] U.S. Cl. ........................................ 106/22; 106/20; 523/160; 524/190; 524/612
[58] Field of Search ................................ 106/20, 22; 260/DIG. 38; 523/160; 524/190, 612

[56] References Cited

U.S. PATENT DOCUMENTS 4,197,135  4/1980  Bailey et al. ................... 106/22
4,659,382  4/1987  Kang ............................. 106/22

*Primary Examiner*—Amelia Burgess Yarbrough
*Attorney, Agent, or Firm*—E. O. Palazzo

[57] ABSTRACT

An improved ink jet composition comprised of a major amount of water, a hydroxypropylated polyethyleneimine with a weight average molecular weight of from about 1,000 to about 10,000, and a dye component; and wherein the ink has a viscosity of from about 1 to about 5 centipoise.

25 Claims, No Drawings

WATERFAST INK JET COMPOSITIONS AND PROCESS

BACKGROUND OF THE INVENTION

The present invention is generally directed to ink compositions useful in various imaging systems, and more specifically, the present invention is directed to certain ink jet printing compositions, and to processes for the preparation thereof. Accordingly, in one embodiment of the present invention, there are provided aqueous ink compositions comprised of modified polyimines, especially specific derivatives of polyethyleneimines. The aforementioned ink compositions, in addition to possessing improved waterfastness, are thermally stable; are of a desirable nonfishy odor; and further, these inks are free of environmental hazards in that they, for example, generate negative Ames test properties, and thus are nonmutagenic. Also, the ink compositions of the present invention can be altered by adding thereto spreading substances such as benzyl alcohol, thereby enabling increased spot sizes. In addition, the ink compositions of the present invention also possess other desirable characteristics including low viscosity values; and further, these compositions are stable at elevated temperatures.

Compositions which are useful in ink jet printing systems are well known, and generally contain water soluble dyes. There is thus disclosed, for example, in U.S. Pat. No. 3,846,141 an ink composition useful in jet printing comprised of an aqueous solution of a water soluble dye, and a humectant material formed of a misture of a lower alkocy triglycol; and at least one other compound selected from the group consisting of a polyethylene glycol, a lower alkyl ether of diethylene glycol, and glycerol. According to the disclosure of this patent, the printing inks viscosity is subjected to little variation with use as water is lost by evaporation during recirculation of the ink composition through the jet printer. Moreover, apparently the humectant system disclosed in this patent substantially prevents or minimizes tip drying of the printing ink in the jet orifice or nozzle during down time of the printer, such as when the printer is rendered inoperative. As further disclosed in this patent, the basic imaging technique in jet printing involves the use of one or more ink jet assemblies connected to a pressurized source of ink. Each individual ink jet includes a very small orifice usually of a diameter of 0.0024 inches, which is energized by magneto restrictive piezo-electric means for the purpose of emitting a continuous stream of uniform droplets of ink at a rate of 33 to 75 kilohertz. This stream of droplets is desirably directed onto the surface of a moving web of, for example paper, and is controlled to form printed characters in response to video signals derived from an electronic character generator and in response to an electrostatic deflection system.

Also, there is disclosed in U.S. Pat. No. 4,279,653 ink jet compositions containing water-soluble wetting agents, a water-soluble dye and an oxygen absorber. Similarly, U.S. Pat. No. 4,196,007 describes an ink jet printing composition containing an aqueous solution of a water-soluble dye and a humectant consisting of at least one water-soluble unsaturated compound. Further, there is disclosed in U.S. Pat. No. 4,267,088 coatings particularly useful as marking inks wherein there is selected an epichlorohydrin - modified polyethyleneimine, and an ethylene oxide modified polyethyleneimine in an aqueous solution. Other patents of interest are U.S. Pat. Nos. 4,101,329; 4,290,072; 4,383,859; 4,235,773; 4,279,814; 4,443,371; 4,286,989; 4,299,630; 4,167,393; 3,864,296; 4,238,234; 3,234,025; 4,520,143; 3,920,855 and 4,182,612.

Additionally, there are disclosed in U.S. Pat. No. 4,197,135 ink compositions with improved waterfastness comprised of at least one water soluble dye, and a polyamine with 7 or more nitrogen atoms per molecule. Specifically, there is illustrated in this patent an ink composition comprising an aqueous solution of at least one water-soluble dye, and from about 0.5 percent to about 10 percent by weight of a polyamine having 7 or more nitrogen atoms per molecule; and wherein the composition has a pH of 8 or above. In column 1, beginning at line 61, it is indicated that the preferred polyamines have the hydrogen of the primary amine group replaced with either a methyl or a hydroxyethyl group. Examples of fully substituted polyamines selected are outlined in column 2, beginning at line 40, of the U.S. Pat. No. 4,197,135. The invention of the present application is directed to similar inks with the primary exceptions that the amine, and more specifically, the polyethylene amine or polyethyleneimine selected is of a lower molecular weight; and moreover the inks of the present invention are of a lower viscosity thereby providing for superior drop formation.

Furthermore, there is illustrated in U.S. Pat. No. 4,659,382, the disclosure of which is totally incorporated herein by reference, an ink composition with improved waterfastness useful for jet printing processes comprised of a major amount of water, a hydroxyethylated polyethyleneimine polymer, and a dye composition wherein the polymer has incorporated therein from about 65 percent to about 80 percent by weight of hydroxyethyl groups. A specific preferred ink composition illustrated in the aforementioned patent is comprised of from about 70 percent by weight to about 90 percent by weight of water; from about 1 percent by weight to about 10 percent by weight of a dye molecule; from about 2 percent by weight to about 6 percent by weight of a hydroxyethylated polyethyleneimine having incorporated therein from about 65 percent by weight to about 80 percent by weight of hydroxyl substituents; and additive components. The ink compositions of the present invention contain similar components as detailed in the aforementioned patent with the primary exceptions that there are selected for the inks of the present invention hydroxypropylated polyethyleneimines with specific molecular weights and specific viscosities.

Ink compositions for jet printing including those of the present invention can be prepared by a number of known methods. Generally, these methods involve dissolving the various dyes, humectants, viscosity control agents, paper fixing additives, surface tension control additives, biocides, polyimine and anti-oxidants in a known volume of water, followed by adjusting the pH of the solution to desirable level. In those situations where the pigments selected are not water-soluble, the inks are prepared by standard known milling processes. However, the latter pigment dispersions are generally not sufficiently stable, accordingly when incorporated into a printing machine the ink particles tend to agglomerate resulting in the clogging of the small nozzles contained in the ink jet devices.

While the above compositions may be suitable for their intended purposes, there continues to be a need for improved jet ink compositions and processes thereof. Additionally, there continues to be a need for ink jet compositions which when in use result in superior optical print densities, and have excellent waterfastness characteristics. Moreover, there continues to be a need for inks that possess nonmutagenic characteristics enabling them to be safey used in ink jet printing processes. Also, there is a need for ink compositions that enable an increase in the spot size of the ink. Furthermore, there is a need for nonmutagenic ink compositions with acceptable waterfastness characteristics, and a viscosity of from about 1 centipoise to about 5 centipoise, which inks are also thermally stable.

SUMMARY OF THE INVENTION

It is an object of the present invention to provide ink compositions, and process thereof with the above-noted advantages.

In another object of the present invention there are provided ink jet compositions with excellent waterfastness characteristics.

In another object of the present invention there are provided ink compositions with certain low molecular weight polyethyleneimines therein and dyes.

An additional object of the present invention resides in the provision of ink compositions containing in addition to low molecular weight from abut 1,000 to about 10,000 weight average hydroxypropylated polyethyleneimines, spreading additives, humectants, biocides, chelating agents, and buffer solutions.

A further object of the present invention relates to the provision of thermally stable nonmutagenic aqueous ink compositions comprised of dyes and hydroxypropylated polyethyleneimines with a weight average molecular weight of from about 3,000 to about 10,000.

Furthermore, in another object of the present invention there are provided ink compositions with hydroxypropylated polyethyleneimines and spreading agent components for the purpose of enabling increased spot size on substrates such as paper.

These and other objects of the present invention are accomplished by the provision of ink compositions for jet printing comprised of low molecular weight hydroxypropylated polyethyleneimines, dyes and water. There is thus provided in one embodiment of the present invention an ink composition with excellent waterfastness useful for jet printing processes comprised of a major amount of water, a hydroxypropylated polyethyleneimine polymer with a weight average molecular weight of from about 1,000 to about 10,000, and a dye composition wherein the resulting inks possess a viscosity of from about 1 to about 5 centipoise thereby enabling effective drop formation.

A specific preferred ink composition of the present invention is comprised of from about 70 percent by weight to about 90 percent by weight of water; from about 1 percent by weight to about 10 percent by weight of a dye molecule; from about 2 percent by weight to about 6 percent by weight of a hydroxypropylated polyethyleneimine polymer with a weight average molecular weight of from about 1,000 to about 10,000; and additive components as illustrated hereinafter.

The hydroxypropylated polyethyleneimines selected for the ink compositions of the present invention are not commercially available, rather they were obtained from Morton Thiokel Corporation and Japan Catalytic Chemical Industry Company, Ltd.. These polymers possess a weight average molecular weight of from about 1,000 to about 10,000 thereby enabling inks with a desirable viscosity of from about 2 to about 5. From about 1.0 to about 10 and preferably from about 1.0 to about 6.0 percent by weight of the hydroxypropylated polyethyleneimine is present in the aforementioned ink compositions, however, other amounts may be selected providing the objectives of the present invention are achieved.

Illustrative examples of dyes that may be selected for the ink compositions of the present invention include Pontamine; Food Black 2; Carodirect Turquoise FBL Supra Conc. (Direct Blue 199), available from Caroline Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; and Yellow Shade 16948, available from Tricon. From about 1 to about 10, and preferably from about 4 to 8 percent by weight of dye is preset in the ink composition, however, other amounts may be selected providing the objectives of the present invention are achieved.

The ink compositions of the present invention include therein a major amount of water, preferably distilled or deionized water. For example, the amount of water present is from about 70 percent to about 90 percent, and preferably from about 80 to about 85 percent by weight.

Additives may be incorporated into the ink compositions of the present invention inclusive of biocides in an amount of 0.1 to 0.5 percent, and preferably in an amount of 0.1 percent by weight, such as Dowcil-75; chelating agents in an amount of from about 0.1 percent to about 0.5 percent by weight, and preferably in an amount of from about 0.2 percent by weight to about 0.4 percent by weight, such as EDTA $Na_4$, commercially available; a buffer solution present in an amount of from about 5 percent to about 20 percent, and preferably in an amount of 5 to 10 weight percent, inclusive of a mixture of a sodium hydroxide solution and a sodium bicarbonate solution; and a humectant such as glycerol in an amount of from about 1 percent to about 15 weight percent, and preferably in an amount of from about 5 percent to about 10 weight percent.

Important specific properties associated with many of the ink compositions of the present invention include a pH of from about 8 to about 10, a surface tension of from about 30 dynes/$cm^2$ to about 60 dynes/$cm^2$, a viscosity from about 2 to about 5, a waterfastness of from about 80 to about 95 percent, solution stability light fastness characteristics, and desirable optical densities on paper of about 1.2. Moreover, the ink compositions of the present invention are very useful in ink jet printing systems since, for example, the ink jet nozzles directing the ink remain essentially open and unclogged, which is not the situation with many ink compositions of the prior art. Also, the ink compositions of the present invention can effectively penetrate the spaced between the fibers contained on the paper substrate allowing a desirable matte finish, and further the inks of the present invention primarily because of their low viscosity permit superior drop formation.

A further embodiment of the present invention comprises adding to the ink composition spreading substances in an amount of from about 1 percent by weight to about 10 percent by weight, and preferably from about 1 percent by weight to about 5 percent by weight. Examples of the aforementioned substances are benzyl alcohol, N-butyldiethanolamine, 2-(2-butoxyethoxy)-ethanol, and 1-methyl-2-pyrrolidinone. Specifically, the purpose of these substances is to increase the spot size on the paper, for example. Thus, a solid image usually requires about 35 percent overlap between ink spots. In some situations, inks with polyethyleneimines contained therein may decrease the ink drop spread on the paper, therefore, these inks may have very small spot sizes. Accordingly, the aforementioned spreading agents are incorporated therein.

The following examples are being supplied to further define various species of the present invention, it being noted that these examples are intended to be illustrative only and are not intended to limit the scope of the present invention. Parts and percentages are by weight unless otherwise indicated.

EXAMPLE I

There was prepared a black ink composition by admixing 9 percent by weight of the dye Pontamine Black SP Liquid obtained from Mobay Chemical Company; 3 percent by weight of a hydroxypropylated polyethyleneimine obtained from Morton Thiokel Corporation with a weight average molecular weight of 10,000; 0.1 percent by weight of Dowicil - 75; 0.2 percent by weight of EDTA Na$_4$; a buffer consisting of 33 parts by volume of a 0.05 molar sodium bicarbonate and 10 parts by volume of 0.1 molar sodium hydroxide, 2 percent by weight; 3 percent by weight of N-methylpyrrolidine, a solubilizer; and 3 percent by weight of benzyl alcohol; and the balance, about 83 percent by weight, of deionized water.

After mixing for two hours, the ink was filtered through a 5 micron, then a 0.2 micron size filter for the purpose of removing any contamination.

This ink had a measured viscosity of 1.94 centipoise and a waterfastness of 84 percent as determined by measuring the optical densities prior to, and subsequent to immersing the ink as a coating on paper in water for five minutes with stirring. The waterfastness is the ratio of the optical density after immersion into water, and before immersion into water.

Similar ink compositions were prepared by repeating the above procedure with the exception that there was selected for the first ink 5 percent of Acid Red 249 in place of the Black SP Liquid, and a hydroxyethylated polyethyleneimine with a weight average molecular weight of 50,000; and a second ink where there was selected Cartasol Yellow 3GF, 5 percent by weight, and wherein the molecular weight of the hydroxypropylated polyethyleneimine was 10,000. These two inks had a viscosity of 1.96 and 1.83, and a waterfastness of 68 and 87, respectively.

There was then prepared a third ink composition, with 5 percent of Acid Red 249; a fourth ink composition with Cartasol Yellow 3GF, 15 percent by weight; and a fifth ink composition with 9 percent by weight of Black SP Liquid, by repeating the above procedure with the exceptions that there was selected a hydroxypropylated polyethyleneimine with a weight average molecular weight of 1,000. These inks had a viscosity of 1.58, 1.60 and 1.98, and a waterfastness of 65, 83, and 77, respectively.

EXAMPLE II

There were prepared three ink compositions by repeating the procedure of Example I with the exceptions that there was selected for the sixth ink 8 percent by weight of Acid Red 249, and for the seventh ink 6 percent by weight of Cartasol Yellow 3GF. The eighth ink contained 9 percent by weight of the Black SP Liquid. Also, the aforementioned inks contained zero percent of the hydroxypropylated polyethyleneimine, and the percentage amount of water was adjusted to enable an ink composition with the total percentage of components equaling 100 percent. The waterfastness for these inks was 42, 57, and 54, respectively. Similar inks were then prepared with the exception that there was selected 3.0 percent by weight of a hydroxyethylated polyethyleneimine with a weight average molecular weight of 50,000, and the waterfastness of the resulting inks was 81, 83, and 77, respectively. Additionally similar inks were then prepared with the exception that there was selected 3.0 percent by weight of a hydroxypropylated polyethyleneimine with a weight average molecular weight of 1,000 and the waterfastness of the resulting inks was 91, 92, and 84, respectively. Furthermore, three additional inks were then prepared with the exception that there was selected 3.0 percent by weight of a hydroxypropylated polyethyleneimine with a weight average molecular weight of 10,000, and the waterfastness of the resulting inks was 94, 92, and 79, respectively.

With respect to the above Examples, where appropriate the amounts of the components are adjusted to enable inks with a total of about 100 percent of the materials selected.

Furthermore, the ink compositions of the present invention can be selected for the development of images with a deflection ink jet printing text fixture, and wherein there are obtained images of acceptable resolution. More specifically, there is provided in accordance with the present invention a method for the generation of images which comprises providing an ink jet printing apparatus; generating an image on a substrate; and subsequently affecting development of this image with an ink composition comprised of a major amount of water, a hydroxypropylated polyethyleneimine polymer with a weight average molecular weight of from about 1,000 to about 10,000 and a dye component; and wherein the ink has a viscosity of from about 1 to about 5 centipoise.

Other modifications of the invention may occur to those skilled in the art subsequent to a review of the present application, and these modifications as well as equivalents thereof are intended to be included within the scope of the present invention.

What is claimed is:

1. A waterfast ink jet composition comprised of a major amount of water, a hydroxypropylated polyethyleneimine with a weight average molecular weight of from about 1,000 to about 10,000, and a dye component, and wherein the ink has a viscosity of from about 1 to about 5 centipoise.

2. A composition in accordance with claim 1 wherein the hydroxypropylated polyethyleneimine is of a molecular weight of about 10,000.

3. A composition in accordance with claim 1 wherein the ink has a viscosity of from about 1.5 to about 3 centipoise.

4. A composition in accordance with claim 1 wherein the pH of the ink is from about 8 to about 10.

5. A composition in accordance with claim 1 wherein the water is present in an amount of from about 70 to about 90 percent by weight.

6. A composition in accordance with claim 1 wherein the dye is black.

7. A composition in accordance with claim 6 wherein the black dye is selected from the group consisting of Direct Dyes, Acid Dyes, Food Dyes, and Reactive Dyes.

8. A composition in accordance with claim 6 wherein the black dye is Pontamine Black SP Liquid.

9. A composition in accordance with claim 1 wherein a colored dye is selected.

10. A composition in accordance with claim 9 wherein the colored dye is selected from the group consisting of blue, red, yellow, and mixtures thereof.

11. A composition in accordance with claim 1 wherein the hydroxypropylated polyethyleneimine is present in an amount of from about 2 percent by weight to about 6 percent by weight.

12. A composition in accordance with claim 1 wherein the dye is present in an amount of from about 1 percent by weight to about 10 percent by weight.

13. A composition in accordance with claim 1 further including therein a component selected from the group consisting of benzyl alcohol, N-butyldiethanolamine, 2-(2-butoxyethoxy)-ethanol, and 1-methyl-2-pyrrolidinone.

14. A composition in accordance with claim 13 wherein the components selected are present in an amount of from about 0.5 to about 5 percent by weight.

15. A method for the generation of images which comprises providing an ink jet printing apparatus; generating an image on a substrate; and subsequently affecting development of this image with an ink composition comprised of a major amount of water, a hydroxypropylated polyethyleneimine with a weight average molecular weight of from about 1,000 to about 10,000, and a dye componet; and wherein the ink has a viscosity of from about 1 to about 5 centipoise.

16. A method of imaging in accordance with claim 15 wherein the hydroxypropylated polyethyleneimine has a molecular weight of about 10,000.

17. A method of imaging in accordance with claim 15 wherein the viscosity of the ink is from about 2 to about 3 centipoise.

18. A method of imaging in accordance with claim 15 wherein the pH of the ink is from about 8 to about 10.

19. A method of imaging in accordance with claim 15 wherein the dye for the ink is black and is selected from the group consisting of Direct Dyes, Acid Dyes, Food Dyes, and Reactive Dyes.

20. A method of imaging in accordance with claim 19 wherein the black dye is Pontamine Black SP Liquid.

21. A method of imaging in accordance with claim 15 wherein a colored dye is selected for the ink.

22. A method of imaging in accordance with claim 21 wherein the colored dye is selected from the group consisting of red, blue and yellow.

23. A method of imaging in accordance with claim 15 wherein the ink further includes therein a component selected from the group consisting of benzyl alcohol, N-butyldiethanolamine, 2-(2-butoxyethoxy)-ethanol, and 1-methyl-2-pyrrolidinone.

24. A composition in accordance with claim 1 wherein the ink exhibits a waterfastness of from about 80 to about 95 percent.

25. A composition in accordance with claim 24 wherein the dye is selected from the group consisting of Pontamine Black SP, Acid Red 249, and Cartasol Yellow 3GF.

* * * * *